US008448529B2

(12) United States Patent
Aoyama et al.

(10) Patent No.: US 8,448,529 B2
(45) Date of Patent: May 28, 2013

(54) APPARATUS AND METHOD FOR DETERMINING SEAT OCCUPANCY

(75) Inventors: Mutsuro Aoyama, Nagoya (JP); Hideki Kawabata, Chita-gun (JP); Muneto Inayoshi, Nagoya (JP); Kan Ichihara, Kariya (JP); Kazumasa Seo, Nisshin (JP); Isao Honda, Anjo (JP); Takeshi Kuwabara, Gifu (JP); Hiroyuki Fujii, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 278 days.

(21) Appl. No.: 12/890,911

(22) Filed: Sep. 27, 2010

(65) Prior Publication Data

US 2011/0094317 A1    Apr. 28, 2011

(30) Foreign Application Priority Data

Oct. 22, 2009   (JP) ................. 2009-243526

(51) Int. Cl.
  *G01L 1/00*   (2006.01)
(52) U.S. Cl.
  USPC ................. 73/862.381; 73/862.391
(58) Field of Classification Search
  USPC ......... 73/862.381, 862.391
  See application file for complete search history.

(56) References Cited

U.S. PATENT DOCUMENTS

| | | | |
|---|---|---|---|
| 6,494,284 B1 * | 12/2002 | Cooper | 180/282 |
| 6,903,280 B2 * | 6/2005 | Selig et al. | 177/144 |
| 8,285,455 B2 | 10/2012 | Inayoshi et al. | |
| 8,296,099 B2 | 10/2012 | Ito et al. | |
| 8,328,276 B2 | 12/2012 | Inayoshi et al. | |
| 2004/0140137 A1 * | 7/2004 | Selig et al. | 177/144 |
| 2007/0114768 A1 * | 5/2007 | Lennir | 280/735 |
| 2007/0120347 A1 * | 5/2007 | Breed et al. | 280/735 |
| 2009/0030576 A1 * | 1/2009 | Periot et al. | 701/45 |
| 2011/0005843 A1 | 1/2011 | Ito et al. | |
| 2011/0010037 A1 | 1/2011 | Inayoshi et al. | |
| 2011/0010038 A1 | 1/2011 | Inayoshi et al. | |
| 2011/0010039 A1 | 1/2011 | Inayoshi et al. | |
| 2011/0010056 A1 | 1/2011 | Inayoshi et al. | |
| 2011/0095580 A1 | 4/2011 | Inayoshi et al. | |
| 2011/0098891 A1 | 4/2011 | Inayoshi et al. | |

FOREIGN PATENT DOCUMENTS

JP    2009-36564 A    2/2009

* cited by examiner

*Primary Examiner* — Max Noori
(74) *Attorney, Agent, or Firm* — Buchanan Ingersoll & Rooney PC (57) ABSTRACT

An apparatus for determining a seat occupancy includes a load detecting portion provided between one of a front portion and a rear portion of a seating portion of a seat for a vehicle that includes a lifting function for changing a height position of the seating portion relative to a floor for the vehicle, the seat including a seat back at the rear portion of the seating portion of the seat, the load detecting portion detecting a seating load applied to the seating portion, and a seat occupancy determining portion comparing the seating load detected by the load detecting portion with a predetermined threshold value and determining a seat occupancy state of the seat, the seat occupancy determining portion changing the threshold value based on the height position of the seating portion.

13 Claims, 6 Drawing Sheets

APPARATUS AND METHOD FOR DETERMINING SEAT OCCUPANCY

CROSS REFERENCE TO RELATED APPLICATIONS

This application is based on and claims priority under 35 U.S.C. §119 to Japanese Patent Application 2009-243526, filed on Oct. 22, 2009, the entire content of which is incorporated herein by reference.

TECHNICAL FIELD

This disclosure relates to an apparatus and a method for determining a seat occupancy.

BACKGROUND DISCUSSION

A recent vehicle seat (seat) generally includes a lifting function for adjusting a height of a seat cushion of the seat from a vehicle floor in response to a physique of an occupant seated on the seat (i.e., a seat occupant). The vehicle seat having such lifting function may be equipped with a seat occupancy determining apparatus that detects a load applied to the seat cushion by the occupant and the like so as to determine a seat occupancy state of the seat based on the detected load. Such seat occupancy determining apparatus is disclosed in JP2009-36564A (hereinafter referred to as Reference 1).

According to the seat occupancy determining apparatus disclosed in Reference 1, load sensors are provided respectively at front left, front right, rear left, and rear right portions of a pair of upper rails supporting the seat cushion. A sum of loads detected by the respective load sensors is compared with a predetermined threshold value for determining the seat occupancy state. The seat occupancy state detected by the seat occupancy determining apparatus is used for controlling an air bag operation. For example, in a case where it is determined that an adult is seated on the seat, the air bag is controlled so as to be fully deployable. In a case where it is determined that no occupant or a child in a child seat is seated on the seat, the air bag is controlled so as not to be deployable.

According to the aforementioned vehicle seat having the lifting function, a center of gravity of the seat including the seat occupant may vary depending on the height of the seat cushion that is adjusted by the lifting function.

Figure 7A:
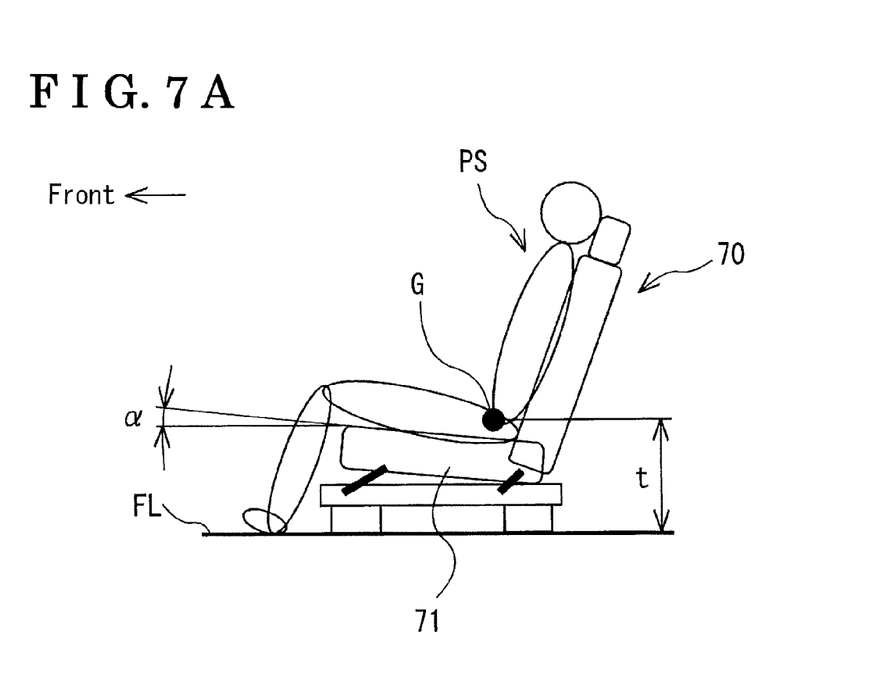
FIG. 7A is a simplified view explaining a load shift of the seat caused by an operation of a lift mechanism in a case where a seat cushion of the seat is arranged at a lowest position.
Figure 7B:
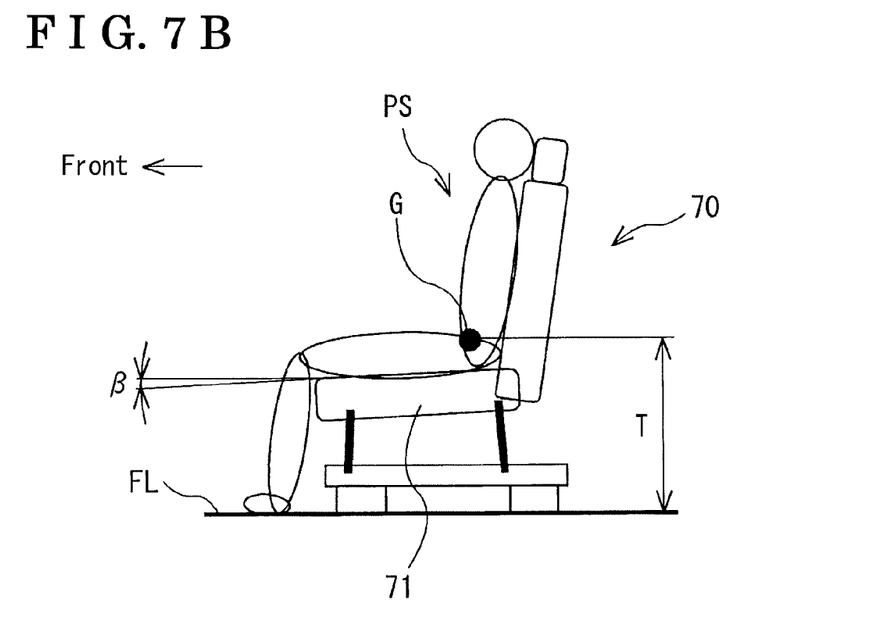
FIG. 7B is a simplified view explaining the load shift of the seat caused by the operation of the lift mechanism in a case where the seat cushion of the seat is arranged at a highest position.

FIG. 7A is a simplified view illustrating a state where a seat cushion 71 of a vehicle seat 70 having the lifting function is arranged at a lowest position. FIG. 7B is a simplified view illustrating a state where the seat cushion 71 of the vehicle seat 70 is lifted by means of the lifting function so as to be arranged at a highest position. As illustrated in FIG. 7A, in a case where the seat cushion 71 is in the lowest position, a center of gravity G of the vehicle seat 70 including a seat occupant PS is defined to be positioned at a height t from a vehicle floor FL. At this time, the seat cushion 71 tends to be inclined in such a manner that a rear portion of the seat cushion 71 is positioned lower than a front portion thereof by an angle α (i.e., a seat surface angle) relative to a horizontal direction.

On the other hand, as illustrated in FIG. 7B, in a case where the seat cushion 71 is in the highest position, the center of gravity G of the vehicle seat 70 is positioned at a height T from the vehicle floor FL, which is higher than the height t of the center of gravity G of the vehicle seat 70 in the lowest position. At this time, the seat cushion 71 tends to be inclined in such a manner that the front portion of the seat cushion 71 is positioned lower than the rear portion thereof by an angle β relative to the horizontal direction (i.e., when the horizontal direction is defined to be zero degree, a relationship β<o<α is obtained).

As seen from a comparison between FIGS. 7A and 7B, in association with the upward movement of the seat cushion 71 from the lowest position to the highest position thereof, the center of gravity G of the vehicle seat 70 including the seat occupant PS moves in a forward direction from a rearward direction of the vehicle seat 70. In addition, the inclination of the seat cushion 71 changes from a state where the rear portion of the seat cushion 71 is lower than the front portion thereof to a state where the front portion of the seat cushion 71 is lower than the rear portion thereof. That is, in the vehicle seat 70 having the lifting function, a seating load applied in a direction towards the vehicle floor FL from the seat cushion 71 moves in a longitudinal direction of the vehicle in association with a vertical movement of the seat cushion 71.

In addition to the above, in order to achieve a reduced cost of the vehicle seat, the load sensor for detecting a seating load of the seat tends to be provided only at the rear portion of the seat cushion. Thus, the detected seating load may increase or decrease only by the vertical movement of the seat cushion. According to a method for simply comparing the load applied to the vehicle seat with a predetermined threshold value regardless of the height of the seat cushion, it may be difficult to precisely determine the seat occupancy state of the vehicle seat.

A need thus exists for an apparatus and a method for determining a seat occupancy which is not susceptible to the drawback mentioned above.

SUMMARY

According to an aspect of this disclosure, an apparatus for determining a seat occupancy includes a load detecting portion provided between one of a front portion and a rear portion of a seating portion of a seat for a vehicle that includes a lifting function for changing a height position of the seating portion relative to a floor for the vehicle, the seat including a seat back at the rear portion of the seating portion of the seat, the load detecting portion detecting a seating load applied to the seating portion, and a seat occupancy determining portion comparing the seating load detected by the load detecting portion with a predetermined threshold value and determining a seat occupancy state of the seat, the seat occupancy determining portion changing the threshold value based on the height position of the seating portion.

According to another aspect of this disclosure, a method for determining a seat occupancy includes detecting a seating load applied to one of a front portion and a rear portion of a seating portion of a seat for a vehicle that includes a lifting function to change a height position of the seating portion relative to a floor for the vehicle, the seat including a seat back at the rear portion of the seating portion of the seat, and comparing the seating load applied to the seating portion with a predetermined threshold value and changing the threshold value based on the height position of the seating portion to determine a seat occupancy state of the seat.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A first embodiment disclosed here will be explained with reference to FIGS. 1 to 5. In the description, a front direction seen by an occupant seated on a seat for a vehicle (which will be referred to as a seat) 1 corresponds to a front side of the seat 1. Likewise, a rear direction seen by the occupant seated on the seat 1 corresponds to a rear side of the seat 1. Further, a right direction seen by the occupant seated on the seat 1 corresponds to a right side of the seat 1 while a left direction seen by the occupant seated on the seat 1 corresponds to a left side of the seat 1.

Figure 1:
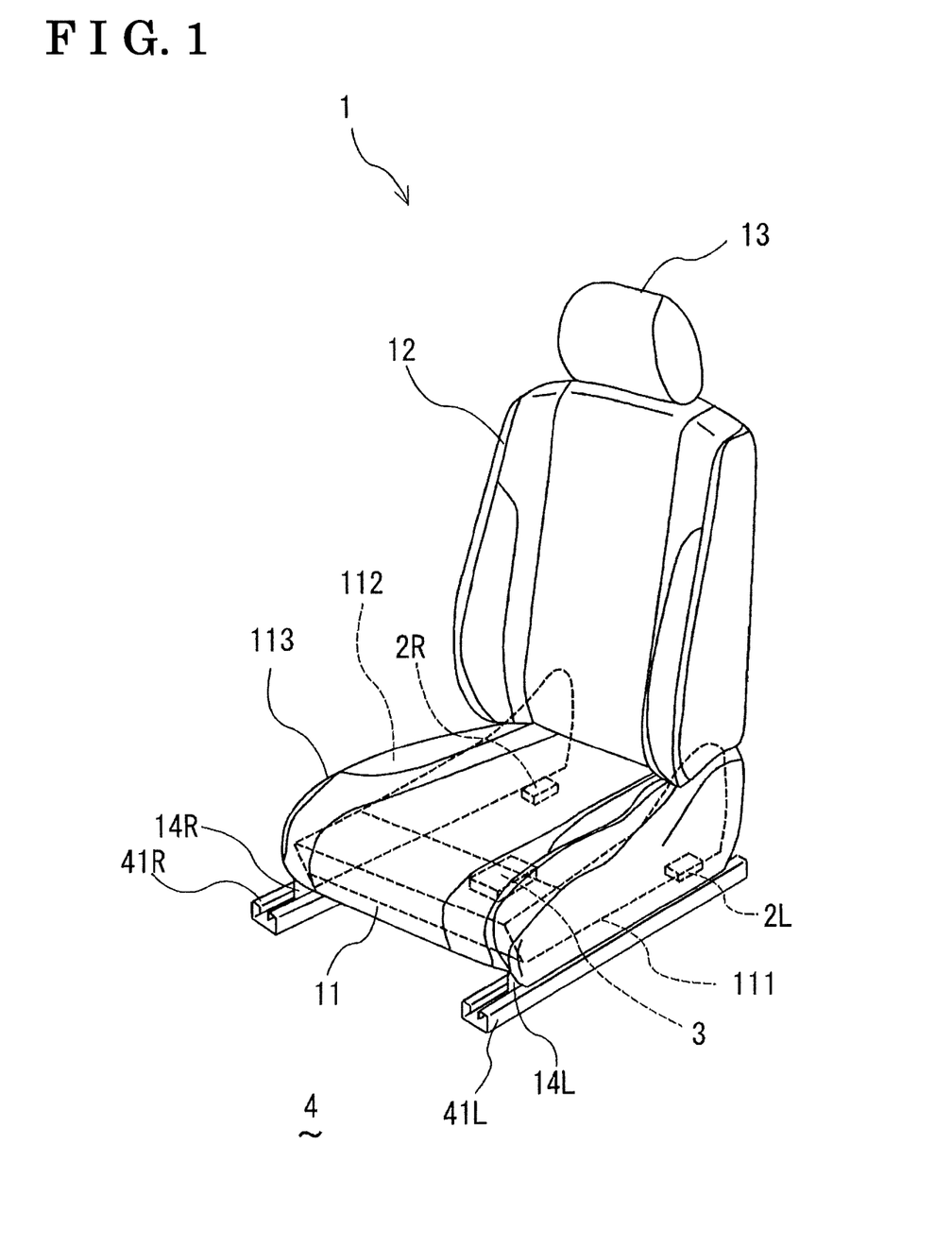
FIG. 1 is a perspective view of a seat for a vehicle where an apparatus for determining a seat occupancy according to a first embodiment disclosed here is provided.

As illustrated in FIG. 1, the seat 1, which is a front passenger seat mounted on a vehicle, includes a seat cushion 11 (a seating portion), on which the occupant is seated, and a seat back 12 attached to a rear end portion of the seat cushion 11 so as to be rotatable in a front-rear direction of the vehicle and supporting the back of the occupant. A head rest 13 for supporting the head of the occupant is attached to a top end of the seat back 12.

The seat cushion 11 includes a seat frame 111, a pad member 112 arranged at an upper portion of the seat frame 111, and a cover 113 covering a surface of the pad member 112. A pair of upper rails (right and left upper rails) 14R and 14L is arranged at a lower surface of the seat frame 111 via a lift mechanism 15 which will be described below (see FIG. 2). The pair of upper rails 14R and 14L extends in the front-rear direction of the vehicle.

The pair of upper rails 14R and 14L engages with a pair of lower rails (right and left lower rails) 41R and 41L fixed at a floor for a vehicle (hereinafter referred to as a floor) 4 so as to be movable in the front-rear direction of the vehicle. Accordingly, the seat 1 is configured to be movable in the front-rear direction of the vehicle on the floor 4 and is located at a position desirably selected by the occupant.

Figure 2:
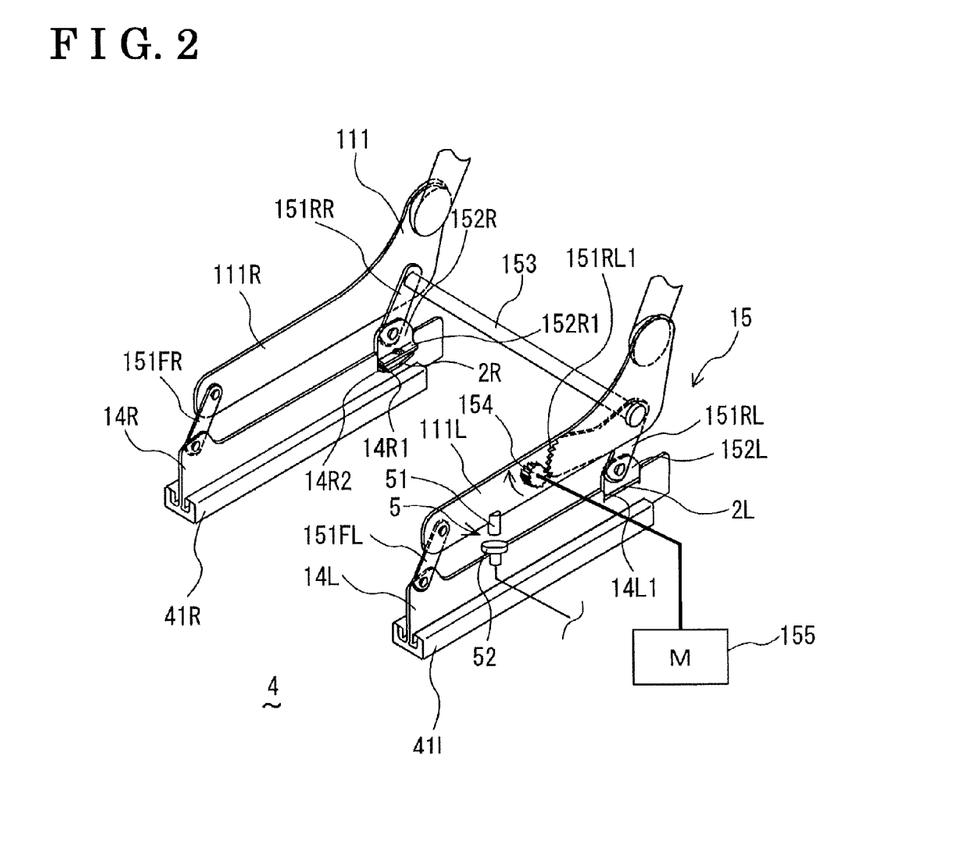
FIG. 2 is a perspective view illustrating an inner lower portion of the seat shown in FIG. 1.

As illustrated in FIG. 2, the lift mechanism 15 is arranged between the lower surface of the seat frame 111 and the pair of upper rails 14R and 14L for connecting the seat frame 111 and the upper rails 14R and 14L with each other. The lift mechanism 15 includes a longitudinal pair of a front right link 151FR and a rear right link 151RR and a longitudinal pair of a front left link 151FL and a rear left link 151RL. In the following, in a case where the front right link 151FR, the rear right link 151RR, the front left link 151FL, and the rear left link 151RL are collectively described, the term "the links 151FR, 151RR, 151FL and 151RL" will be used.

The front right link 151FR connects a front portion of a right frame member 111R, which is a portion of the seat frame 111, to the right upper rail 14R. Meanwhile, the front left link 151FL connects a front portion of a left frame member 111L, which is a portion of the seat frame 111, to the left upper rail 14L.

Further, the rear right link 151RR and the rear left link 151RL arranged at rear portions of the right and left frame members 111R and 111L, respectively, are attached to the right and left upper rails 14R and 14L by respective retainers (right and left retainers) 152R and 152L. The retainers 152R and 152L are accommodated within recessed portions (right and left recessed portions) 14R1 and 14L1 formed in the upper rails 14R and 14L, respectively. Each of the recessed portions 14R1 and 14L1 has an opening that faces upward in a vertical direction of the vehicle as seen in FIG. 2. Upper flange portions (right and left upper flange portions) 152R1 and 152L1 extending inwardly in a width direction (i.e., a left and right direction) of the seat cushion 11 are integrally formed at lower surfaces of the retainers 152R and 152L, respectively (FIG. 2 only illustrates the right upper flange portion 152R1).

Furthermore, lower flange portions (right and left lower flange portions) 14R2 and 14L2 are integrally formed at bottom surfaces of the recessed portions 14R1 and 14L1, respectively. The lower flange portions 14R2 and 14L2 extend inwardly in the width direction of the seat cushion 11 in the same way as the upper flange portions 152R1 and 152L1 while being positioned to face the upper flange portions 152R1 and 152L1 in the vertical direction (FIG. 2 only illustrates the right lower flange portion 14R2).

A right seat sensor 2R serving as a load detecting portion is provided between the right upper flange portion 152R1 and the right lower flange portion 14R2 while a left seat sensor 2L serving as the load detecting portion is provided between the left upper flange portion 152L1 and the left lower flange portion 14L2. In the following, in a case where the right seat sensor 2R and the left seat sensor 2L are collectively described, the term "the seat sensors 2R and 2L" will be used. Details of the seat sensors 2R and 2L will be explained below. The right links 151FR and 151RR are rotatably attached to the right frame member 111R, the right upper rail 14R, and the right retainer 152R while the left links 151FL and 151RL are rotatably attached to the left frame member 111L, the left upper rail 14L, and the left retainer 152L.

The rear right link 151RR and the rear left rink 151RL are connected to each other by a connecting rod 153 of the lift mechanism 15. The links 151RR and 151RL are fixed to both ends of the connecting rod 153 by welding and the like. Thus, the links 151RR and 151RL, and the connecting rod 153 achieve an integrally formed lift member (i.e., the lift mechanism 15) having rigidity. The both ends of the connecting rod 153 are pivotally supported by respective rear portions of the pair of frame members 111R and 111L, thereby supporting the frame members 111R and 111L in a condition where a distance between the frame members 111R and 111L is unchanged. As illustrated in FIG. 2, the rear left link 151RL has a shape so that an intermediate portion of the rear left link 151RL is bent. A gear tooth portion 151RL1 is formed at a front end portion of the link 151RL. A pinion gear 154 is rotatably attached to a left lateral surface of the left frame member 111L. A rotary shaft of the pinion gear 154 extends in the width direction of the vehicle so that the pinion gear 154 engages with the gear tooth portion 151RL1 formed at the link 151RL. The pinion gear 154 is driven by an electric motor 155 attached to the left frame member 111L.

A position sensor 5 serving as a position detecting portion is disposed between the left frame member 111L and the left upper rail 14L. The position sensor 5 includes a sensor movable body 51 attached to a lower end of the left frame member 111L and a sensor detecting portion 52 attached to an upper surface of the left upper rail 14L. Based on a moving amount of the sensor movable body 51 relative to the sensor detecting portion 52, the height position of the left frame member 111L relative to the left upper rail 14L and eventually a height H of the seat cushion 11 relative to the floor 4 are detected.

The position sensor 5 of which a type, a model, and a detection principle are not specifically defined may be an eddy current displacement sensor, a capacitive displacement sensor, a Hall element displacement sensor (including a Hall IC), an optical displacement sensor, and the like. In addition, the position sensor 5 may be a sensor for detecting an angle of the links 151FR, 151RR, 151FL, and 151RL, the moving amount or the position of the connecting rod 153.

Further, instead of the position sensor 5, a rotary switch or a limit switch may be provided for detecting the moving amount of the links 151FR, 151RR, 151FL and 151RL or the connecting rod 153.

According to the configuration as described above, in a case where the lift mechanism 15 is operated by the occupant of the seat 1 so as to move upward the seat cushion 11, the electric motor 155 is activated. Then, the pinion gear 154 is driven by the electric motor 155 so as to rotate in a clockwise direction in FIG. 2, which is shown by an arrow in FIG. 2, to thereby rotate the rear left link 151RL about an attachment portion thereof relative to the retainer 152L. Therefore, the left frame member 111L is moved obliquely upward and forward while a posture of the left frame member 111L in the substantially horizontal direction is maintained by the front left link 151FL. In addition, the right frame member 111R is moved obliquely upward and forward by the connecting rod 153 and the rear right link 151RR that is integrally formed with the connecting rod 153 and the rear left link 151RL while a posture of the right frame member 111R in the substantially horizontal direction is maintained by the front right link 151FR and the rear right link 151RR.

On the other hand, in a case where the pinion gear 154 is driven by the electric motor 155 to rotate in a counterclockwise direction in FIG. 2 (i.e., in an opposite direction from the arrow shown in FIG. 2) in a state where the right and left frame members 111R and 111L are positioned upward, the rear left link 151RL rotates in an opposite direction from the direction described above. Consequently, the left frame member 111L is moved obliquely downward and rearward while the posture of the left frame member 111L in the substantially horizontal direction is maintained by the front left link 151FL. The right frame member 111R is also moved obliquely downward and rearward along with the left frame member 111L while the posture of the right frame member 111R in the substantially horizontal direction is maintained by the right links 151FR and 151RR.

The right and left seat sensors 2R and 2L are load sensors each formed by a strain gauge and the like. The seat sensors 2R and 2L detect a load applied to the seat cushion 11 in a downward direction of the vehicle, for example, when the occupant is seated on the seat 1, luggage is placed on the seat 1, and the like. In the first embodiment, regardless of whether or not the aforementioned load is generated by the occupant seated on the seat 1, a child seat placed on the seat 1, or luggage placed on the seat 1, the load applied to the seat cushion 11 and detected by the seat sensors 2R and 2L is regarded as a seating load. In addition, according to the present embodiment, a type, a model, and a detection principle of each of the seat sensors 2R and 2L are not specifically defined as in the same way as the position sensor 5.

The right seat sensor 2R is disposed between the retainer 152R connected to the rear right link 151RR and the right upper rail 14R so as to detect the load applied to a right portion of the seat cushion 11. In the same way, the left seat sensor 2L is disposed between the retainer 152L connected to the rear left link 151RL and the left upper rail 14L so as to detect the load applied to a left portion of the seat cushion 11. The right seat sensor 2R and the left seat sensor 2L are both arranged at a rear portion of the seat cushion 11 so as to have a predetermined distance between the right seat sensor 2R and the left seat sensor 2L in the width direction of the seat cushion 11.

Figure 3:
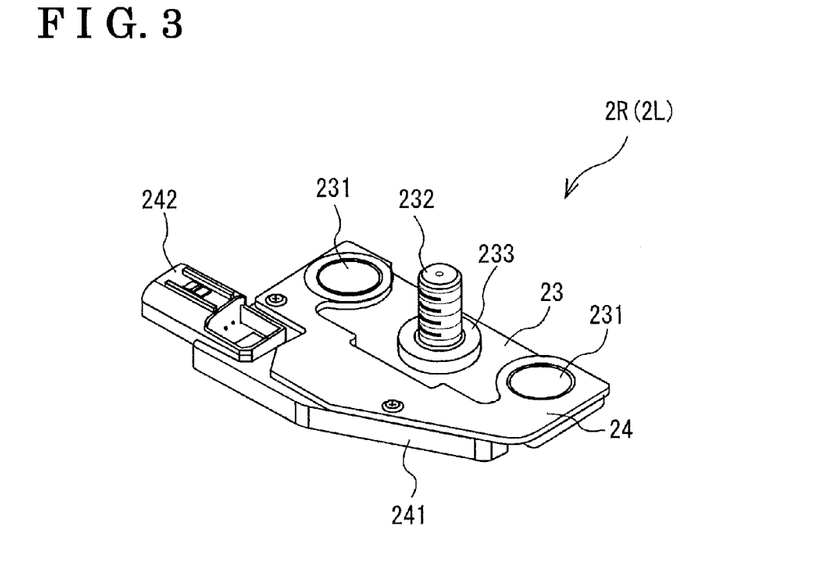
FIG. 3 is an enlarged view of a seat sensor shown in FIG. 1.

Details of the seat sensors 2R and 2L will be described as follows with reference to FIG. 3. As illustrated in FIG. 3 (illustrating the seat sensor 2R only), the seat sensor 2R includes an elastic body 23 formed by metal, a bracket 24 supporting the elastic body 23, and an amplifier case 241 formed at a lower surface of the bracket 24. A strain gauge configuring a sensing portion 21R which will be explained below is attached to a lower surface of the elastic body 23. Further, a signal amplifying portion 22R which will be explained below is accommodated within the amplifier case 241. A connector 242 is integrally formed at a frond end of the amplifier case 241. The seat sensor 2R is connected to a controller 3 by the connector 242.

Attachment holes to which bushes 231 are attached are formed in the front and rear ends of the elastic body 23, respectively. Attachment bolts vertically arranged at the lower flange portion 14R2 are inserted in the bushes 231 from a lower side of the bracket 24 and tightening nuts are screwed with the attachments bolts from an upper side of the bracket 24 (upper and lower sides of the bracket 24 correspond to a vertical direction in FIG. 3. Accordingly, the elastic body 23 is attached to the upper rail 14R. In a state where the elastic body 23 is attached to the upper rail 14R, a sufficient clearance is formed between the elastic body 23 and the lower flange portion 14R2 by the thickness of the bushes 231 positioned at a lower side of the elastic body 23.

Further, a stud bolt 232 is attached to an intermediate portion of the elastic body 23. A spacer 233 is attached to the stud bolt 232 so as to be positioned at an upper surface of the elastic body 23 as illustrated in FIG. 3. The stud bolt 232 is inserted into an attachment hole formed in a lower surface of the upper flange portion 152R1 of the retainer 152R. Then, a nut member is fixed to the stud bolt 232 from an upper side of the upper flange portion 152R1; thereby, the elastic body 23 is attached at a lower side of the upper flange portion 152R1. In a state where the elastic body 23 is attached to the upper flange portion 152R1, a sufficient clearance is formed between the elastic body 23 and the upper flange portion 152R1 by the thickness of the spacer 233.

According to the configuration of the seat sensors 2R and 2L described above, the elastic body 23 is formed so as to be strained or deformed in the vertical direction by a relative movement between each of the retainers 152R, 152L, and each of the upper rails 14R and 14L. When the intermediate portion of the elastic body 23, corresponding to an attachment portion of the stud bolt 232, is pressed in the downward direction of the vehicle to be brought in a compressed state, each of the seat sensors 2R and 2L detects the load applied to the seat cushion 11 in the downward direction. The seat sensor 2L has a symmetric shape relative to the seat sensor 2R shown in FIG. 3.

Figure 4:
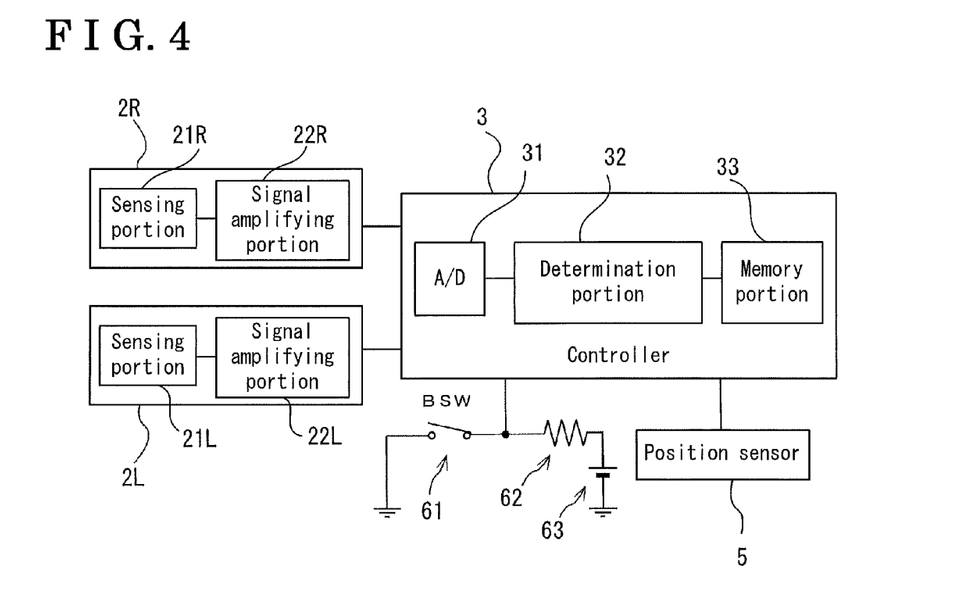
FIG. 4 is a block diagram illustrating the whole apparatus for determining the seat occupancy.

As illustrated in FIG. 4, the seat sensor 2R includes the sensing portion 21R and the signal amplifying portion 22R while the seat sensor 2L includes a sensing portion 21L and a signal amplifying portion 22L. The signal amplifying portions 22R and 22L amplify signals generated by the sensing portions 21R and 21L, respectively. Each of the sensing portions 21R and 21L is formed by a Wheatstone bridge circuit that includes four strain gauges as described above.

The seat sensors 2R and 2L are connected to the controller 3 serving as a seat occupancy determining portion. The controller 3 includes an A/D converter 31, which converts detection signals outputted from the seat sensors 2R and 2L into digital signals, a determination portion 32, which determines a seat occupancy state of the seat 1 (the seat cushion 11) on the basis of the detection signals, and a memory portion 33, which memorizes data required to determine the seat occupancy. The memory portion 33 also stores a map MP including data of threshold values W1, W2, W3, and W4 that will be described below.

Further, a buckle switch 61 of a seat belt device is connected to the controller 3. A battery 63 of the vehicle is connected to the buckle switch 61 via a direct-current resistor 62. When a buckle is in disengagement with a tongue plate in the seat belt device so that the buckle switch 61 is in an open state, an electric current does not flow through the direct-current resistor 62; therefore, the controller 3 detects a positive terminal voltage (High) of the battery 63.

When the buckle is in engagement with the tongue plate in the seat belt device so that the buckle switch 61 is in a closed state, the electric current flows through the direct-current resistor 62; therefore, the controller 3 detects a decrease in voltage (Low) of the battery 63. As a result, the controller 3 determines the engagement of the buckle with the tongue plate, which results in the fastening of the seat belt device by the occupant. Further, the sensor detecting portion 52 of the position sensor 5 is connected to the controller 3. The controller 3 detects the height position of the seat cushion 11 of the seat 1 based on the detected signal from the position sensor 5.

A method for determining the seat occupancy of the seat 1 will be explained with reference to FIG. 5. In the following, a state where the child seat is placed on the seat 1 and the buckle and the tongue plate of the seat belt device are in engagement with each other to thereby fix the child seat to the seat 1 will be described as a child seat fastened state of the seat 1. In addition, a state where an adult is seated on the seat 1 will be described as an adult occupant seated state of the seat 1.

The controller 3 adds up the load detected by the left seat sensor 2L and the load detected by the right seat sensor 2R to obtain a total load WR+WL. The controller 3 then determines whether the state of the seat 1 is the child seat fastened state or the adult occupant seated state by using the map MP shown in FIG. 5 on a basis of the total load WR+WL and a height (i.e., a height position) H of the seat cushion 11 detected by the position sensor 5. The total load WR+WL serves as the seating load.

Figure 5:
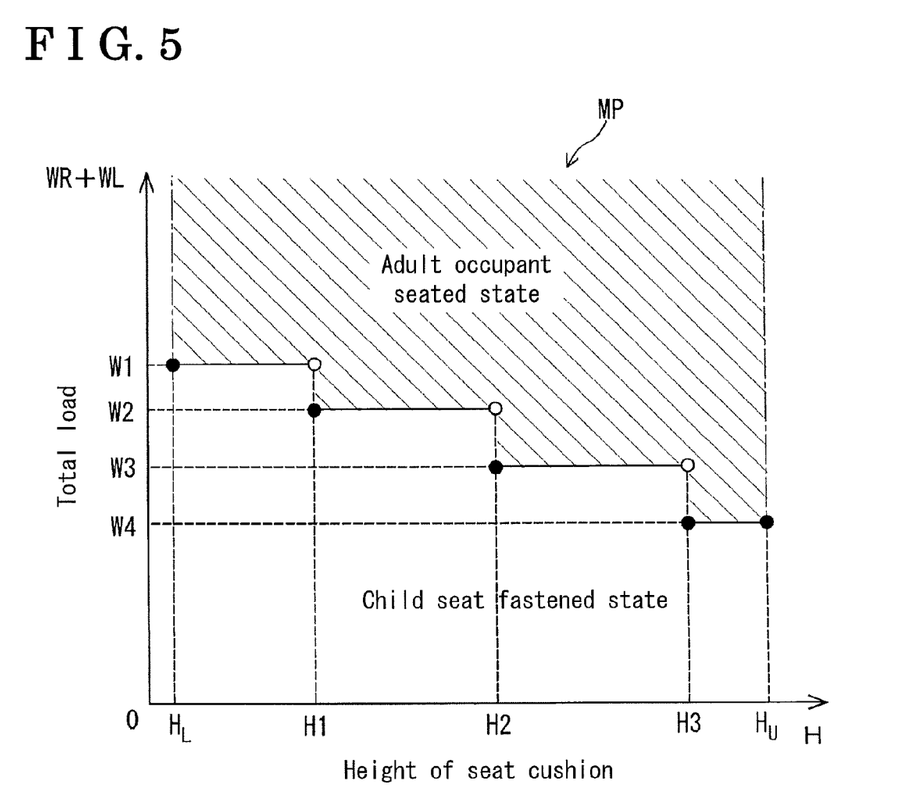
FIG. 5 is a map used for determining the seat occupancy according to the first embodiment disclosed here.

The map MP shown in FIG. 5 has a horizontal axis indicating the height H of the seat cushion 11 from the floor 4 and a vertical axis indicating the total load WR+WL. The map MP also includes predetermined threshold values W1, W2, W3, and W4 specified depending on the height H of the seat cushion 11. In FIG. 5, coordinate points positioned in unfilled circles are not included in line segments indicating the threshold values W1, W2, W3, and W4, respectively. In addition, coordinate points positioned in filled circles are included in the line segments indicating the threshold values W1, W2, W3, and W4. The map MP shown in FIG. 5 may include the vertical axis indicating the height H of the seat cushion 11 from the floor 4 and the horizontal axis indicating the total load WR+WL.

In FIG. 5, the seat cushion 11 is moved up and down within a range from a lowest position (i.e., a minimum value) $H_L$ to a highest position (i.e., a maximum value) $H_U$. The controller 3 determines the adult occupant seated state of the seat 1 in a case where a result of a combination of the detected total load WR+WL and the height H of the seat cushion 11 falls within a hatched area in FIG. 5. The controller 3 determines the child seat fastened state in a case where the result of the combination of the detected total load WR+WL and the height H of the seat cushion 11 falls within an area out of the hatched area and the buckle switch 61 is turned on.

That is, in a case where the buckle switch 61 is turned on and the total load WR+WL is smaller than the corresponding threshold value W1, W2, W3, or W4, the controller 3 determines the child seat fastened state of the seat 1. In addition, the controller 3 determines the adult occupant seated state of the seat 1 in a case where the total load WR+WL is equal to or greater than the corresponding threshold value W1, W2, W3 or W4 regardless of the operation state of the buckle switch 61. In the following, in a case where the threshold values W1, W2, W3, and W4 are collectively described, the term "the threshold values W1 to W4" will be used.

The threshold values W1 to W4 are individually specified depending on the height H of the seat cushion 11 as illustrated in the map MP in FIG. 5. Each of the threshold values W1 to W4 is specified to be constant in a case where the height H of the seat cushion 11 is within each predetermined range. In FIG. 5, the line segments indicating the threshold values W1 to W4 form a step-like shape.

In a case where the height H of the seat cushion 11 from the floor 4 is equal to or greater than the minimum value $H_L$ and smaller than a first value H1 ($H_L \leq H < H1$), the threshold value W1 is applied to the total load WR+WL. In a case where the height H of the seat cushion 11 from the floor 4 is equal to or greater than the first value H1 and smaller than a second value H2 ($H1 \leq H < H2$), the threshold value W2 is applied to the total load WR+WL. In a case where the height H of the seat cushion 11 from the floor 4 is equal to or greater than the second value H2 and smaller than a third value H3 ($H2 \leq H < H3$), the threshold value W3 is applied to the total load WR+WL. In a case where the height H of the seat cushion 11 from the floor 4 is equal to or greater than the third value H3 and smaller than the maximum value $H_U$ ($H3 \leq H < H_U$), the threshold value W4 is applied to the total load WR+WL. As clearly seen in FIG. 5, the threshold value for the seating load decreases, i.e., the greatest threshold value W1 to the smallest threshold value W4 are applied to the seating load, in association with the increase of the height H of the seat cushion 11.

Accordingly, in a case where the height H of the seat cushion 11 is equal to or greater than the minimum value $H_L$ and smaller than the first value H1 ($H_L \leq H < H1$), the adult occupant seated state is determined when the calculated total load WR+WL is equal to or greater than the threshold value W1. When the calculated total load WR+WL is smaller than the threshold value W1 and the buckle switch 61 is turned on, the child seat fastened state is determined.

In addition, in a case where the height H of the seat cushion 11 is equal to or greater than the first value H1 and smaller than the second value H2 ($H1 \leq H < H2$), the adult occupant seated state of the seat 1 is determined when the calculated total load WR+WL is equal to or greater than the threshold value W2. When the calculated total load WR+WL is smaller than the threshold value W2 and the buckle switch 61 is turned on, the child seat fastened state of the seat 1 is determined.

Further, in a case where the height H of the seat cushion 11 is equal to or greater than the second value H2 and smaller than the third value H3 (H2≦H<H3), the adult occupant seated state of the seat 1 is determined when the calculated total load WR+WL is equal to or greater than the threshold value W3. When the calculated total load WR+WL is smaller than the threshold value W3 and the buckle switch 61 is turned on, the child seat fastened state of the seat 1 is determined.

Furthermore, in a case where the height H of the seat cushion 11 is equal to or greater than the third value H3 and smaller than the maximum value $H_U$ (H3≦H<$H_U$), the adult occupant seated state of the seat 1 is determined when the calculated total load WR+WL is equal to or greater than the threshold value W4. When the calculated total load WR+WL is smaller than the threshold value W4 and the buckle switch 61 is turned on, the child seat fastened state of the seat 1 is determined. When the child seat fastened state of the seat 1 is determined, the controller 3 transmits the aforementioned determination result to an air bag ECU. Then, the air bag ECU controls the air bag not to be deployable.

In a case where the adult occupant seated state of the seat 1 is determined, the controller 3 transmits the aforementioned determination result to the air bag ECU. The air bag ECU controls the air bag to be fully deployable. In the map MP shown in FIG. 5, instead of the height H of the seat cushion 11, one of the axes may indicate the position or the angle of the links 151FR, 151RR, 151FL, and 151RL, the position of the connecting rod 153, and the like.

According to the first embodiment, the controller 3 selects and changes the threshold value among the threshold values W1 to W4 to thereby accurately determine the seat occupancy state of the seat 1 by considering the shift (movement) of the seating load in the front-rear direction caused by the change of the height of the seat cushion 11.

In addition, the controller 3 determines that the adult occupant is seated on the seat 1 in a case where the seating load being equal to or greater than one of the applicable threshold values W1 to W4 is detected, and the controller 3 determines that the child seat is fastened or placed on the seat 1 in a case where the seating load being smaller than one of the applicable threshold values W1 to W4 is detected. Thus, the adult occupant seated state and the child seat fastened state are accurately distinguished from each other.

Further, the threshold value is varied or changed on a basis of the height of the seat cushion 11 detected by the position sensor 5, thereby further accurately determining the seat occupancy state of the seat 1 based on the accurate height position of the seat cushion 11 detected by the position sensor 5.

Furthermore, the seat sensors 2R and 2L are attached to right and left portions of the seat cushion 11 respectively so that the respective loads detected by the seat sensors 2R and 2L are added up to obtain the seating load. Therefore, even when the seating load on the right portion of the seat cushion 11 and the seating load on the left portion of the seat cushion 11 are not even, the total seating load is accurately detected.

Furthermore, because the seat sensors 2R and 2L are attached to the rear portion of the seat cushion 11 and the threshold value decreases in association with the increase of the height position of the seat cushion 11, the seat occupancy state of the seat 1 is accurately determined regardless of the forward shift (movement) of the seating load caused by the lifting (upward movement) of the seat cushion 11.

Furthermore, because the seat sensors 2R and 2L are attached to the rear portion of the seat cushion 11, the load generated by the occupant, the child seat, and the like may be easily applied to the seat sensors 2R and 2L. Thus, even when the seat sensors are not provided at the front portion of the seat cushion 11, the load applied to the seat cushion 11 is accurately detected. The accurate determination of the seating state of the seat 1 and a reduced cost of the seat 1 caused by the decrease of the number of seat sensors are both achieved.

Furthermore, because it is determined whether the state of the seat 1 is the adult occupant seated state or the child seat fastened state on a basis of the map MP which includes the horizontal axis indicating the height H of the seat cushion 11 and the vertical axis indicating the total load WR+WL in addition to the threshold values W1 to W4, the determination of the state of the seat 1 is achievable by the reduced number of calculations and a reduced time period.

Figure 6:
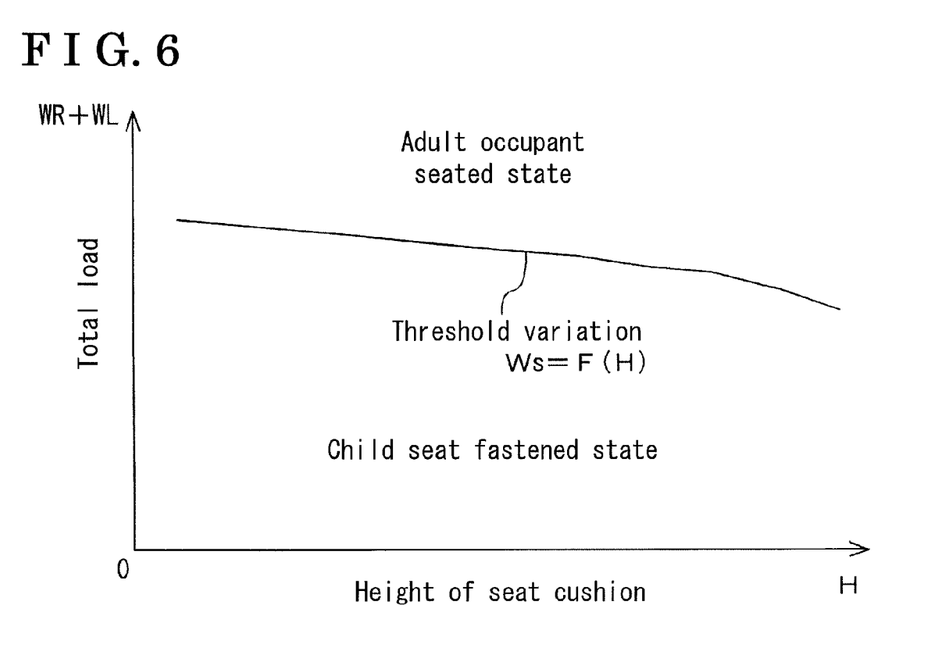
FIG. 6 is a graph illustrating a variation of a threshold value obtained by a function for determining the seat occupancy according to a second embodiment disclosed here.

Next, a second embodiment will be explained with reference to FIG. 6. FIG. 6 is a graph illustrating a variation of the threshold value obtained by a function Ws=F(H) for the seat occupancy determination. According to the aforementioned function, a threshold value Ws for the total load WR+WL is determined depending on the height H of the seat cushion 11 (or the position, angle of the link 151FR, 151RR, 151FL, 151RL or the connecting rod 153) detected by the position sensor 5. The function is stored at the memory portion 33 of the controller 3.

According to the second embodiment, the detected height H of the seat cushion 11 is substituted to the function Ws=F(H) to calculate the threshold value Ws. Once the threshold value Ws is specified, the threshold value Ws is compared with the total load WR+WL at that time to thereby determine the seat occupancy state of the seat 1. In a case where the total load WR+WL is equal to or greater than the threshold value Ws (Ws≦WR+WL), the adult occupant seated state is determined. In a case where the total load WR+WL is smaller than the threshold value Ws and the buckle switch 61 is turned on, the child seat fastened state is determined. The function Ws=F(H) is obtainable on a basis of the seating load detected when the height H of the seat cushion 11 is varied on a trial basis or a geometric calculation on the lift mechanism 15, or the like.

According to the second embodiment, the threshold value Ws for the seating load is specified by the usage of the function Ws=F(H) that determines the threshold value Ws depending on the height H of the seat cushion 11. Thus, the relationship between the height H of the seat cushion 11 and the threshold value Ws for the seating load is approximated to the predetermined function (i.e., the function Ws=F(H)), thereby easily specifying the threshold value Ws in response to the height H of the seat cushion 11.

The aforementioned embodiments may be modified as follows. That is, the apparatus for determining the seat occupancy according to the first and second embodiments is applicable to a middle-row seat or a rear-row seat in addition to the front passenger seat. Further, the method for determining the seat occupancy according to the first and second embodiments is applicable not only to a case where the adult occupant seated state and the child seat fastened state of the seat 1 are determined but also to a case where any seat occupancy state is determined such as the adult occupant seated state, luggage placed state, no occupancy state, and the like.

In addition, the seat sensors 2R and 2L may be pressure sensors for detecting a pressure generated at the sat cushion 11 by the seat occupancy of the seat 1. The load applied to the seat cushion 11 may be obtained on a basis of the detected pressure. Alternatively, the seat sensors 2R and 2L may be displacement sensors for detecting a displacement of the seat cushion 11. The load applied to the seat cushion 11 is detected on a basis of a displacement amount against a biasing force of a seat spring accordingly.

At least one seat sensor may be provided at the front portion or the rear portion of the seat cushion 11. A position where the seat sensor is provided is not limited to a left end or a right end (i.e., to both ends in the width direction of the vehicle) of the seat cushion 11. The threshold value for the seating load may increase in association with the increase of the height position of the seat cushion 11.

The line segments indicating the threshold values W1 to W4 shown in the map MP in FIG. 5 may form into a connected line instead of the step-like shaped line. The lift mechanism 15 is not limited to have the aforementioned configuration and may have any configuration and operation principle. The apparatus for determining the seat occupancy according to the first and second embodiments may be applicable to the vehicle seat including the seat cushion 11 that moves directly in the vertical direction, because the center of gravity of the vehicle seat moves forward by the load shift of the seat occupant itself. Further, the lift mechanism 15 may be achieved by a manual operation by the occupant of the seat 1 to thereby move the seat cushion 11 up and down instead of by the electric motor 155.

According to the first and second embodiments, the threshold value may be determined on a basis of a position, an angle of an element that determines the height H of the seat cushion 11, such as the position or the angle of the links 151FR, 151RR, 151FL, and 151RL forming the lifter mechanism 15, the connecting rod 153, and the like, instead of the height H of the seat cushion 11 that is directly detected. Further, according to the aforementioned first and second embodiments, the threshold value may be determined on a basis of a position, a moving amount, or the like of a member that is displaced in association with the height H of the seat cushion 11, such as an angle of the seating surface of the seat cushion 11.

According to the aforementioned first and second embodiments, the controller 3 changes the threshold value for the seating load based on the height H of the seat cushion 11, thereby accurately determining the seat occupancy state of the seat 1 in response to the movement of the seating load in the longitudinal direction of the vehicle that is caused by the change of the height H of the seat cushion 11.

According to the aforementioned first and second embodiments, the apparatus for determining the seat occupancy further includes the position sensor 5 detecting the height H of the seat cushion 11. The controller 3 changes the threshold value based on the height H of the seat cushion 11 detected by the sensor 2R and 2L.

The threshold value for the seating load is varied or changed on a basis of the height H (height position) of the seat cushion 11 detected by the position sensor 5. Therefore, the seat occupancy state of the seat 1 is accurately determined on a basis of the accurate height position of the seat cushion 11 detected by the position sensor 5.

In addition, the controller 3 determines that the adult is seated on the seat 1 in a case where the seating load being equal to or greater than the corresponding threshold value W1, W2, W3, or W4 is detected by the sensors 2R and 2L and determining the child seat fastened state where the child seat is placed on the seat 1 in a case where the seating load being smaller than the corresponding threshold value W1, W2, W3, or W4 is detected by the sensors 2R and 2L.

In a case where the seating load being equal to or greater than one of the corresponding threshold values W1 to W4 is detected, the adult occupant seated state of the seat 1 (the adult is seated on the seat 1) is determined. In a case where the seating load being smaller than one of the corresponding threshold values W1 to W4 is detected, the child seat fastened state of the seat 1 is determined. Therefore, for example, the adult occupant seated state where the air bag is fully deployable and the child seat fastened state where the air bag is not deployable are accurately distinguished from one another.

Further, the sensor 2L is provided between the floor 4 and the left portion of the seat cushion 11 in the left and right direction thereof that corresponds to the width direction of the seat 1 and the sensor 2R is provided between the floor 4 and the right portion of the seat cushion 11 in the left and right direction thereof. The controller 3 obtains the seating load on a basis of a sum of loads detected by the respective sensors 2R and 2L.

Accordingly, even when the seating load on the right portion of the seat cushion 11 and the seating load on the left portion of the seat cushion 11 are not even, the total seating load is accurately detected.

Furthermore, the sensors 2R and 2L are provided between the rear portion of the seat cushion 11 and the floor 4, and the controller 3 decreases the threshold value in association with an increase of the height H of the seat cushion 11.

Accordingly, regardless of the forward movement of the seating load that is caused in association with the upward movement of the seat cushion 11, the seat occupancy state of the seat 1 is accurately determined.

In addition, because the seat sensors 2R and 2L are arranged between the rear portion of the seat cushion 11 and the floor 4, the load generated by the occupant, the child seat, and the like may be easily applied to the seat sensors 2R and 2L. Thus, even when the seat sensors are not provided at the front portion of the seat cushion 11, the load applied to the seat cushion 11 is accurately detected. The accurate determination of the seating state of the seat 1 and a reduced cost of the seat 1 caused by the decrease of the number of seat sensors are both achieved.

Further, the controller 3 includes the map including one axis indicating one of the height H of the seat cushion 11 and the seating load and another axis indicating the other of the height H of the seat cushion 11 and the seating load for specifying the threshold value. The controller 3 determines the seat occupancy state of the seat 1 based on the map.

Accordingly, the seat occupancy state is determined by the reduced number of calculations and a reduced time period.

Furthermore, the controller 3 specifies the threshold valued by using the function for determining the threshold value in response to the height H of the seat cushion 11 and determines the seat occupancy state of the seat 1 based on the threshold value that is specified by a usage of the function.

Accordingly, the relationship between the height H of the seat cushion 11 and the threshold value for the seating load is approximated to the predetermined function (i.e., the function Ws=F(H)). The threshold value is easily determined on a basis of the height H of the seat cushion 11 accordingly.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An apparatus for determining a seat occupancy, comprising:
    a load detecting portion provided between one of a front portion and a rear portion of a seating portion of a seat for a vehicle that includes a lifting function for changing a height position of the seating portion relative to a floor for the vehicle, the seat including a seat back at the rear portion of the seating portion of the seat, the load detecting portion detecting a seating load applied to the seating portion; and
    a seat occupancy determining portion comparing the seating load detected by the load detecting portion with a threshold value and determining a seat occupancy state of the seat, the seat occupancy determining portion changing the threshold value based on the height position of the seating portion;
    wherein the seat occupancy determining portion specifies the threshold value by using a function for determining the threshold value in response to the height position of the seating portion and determines the seat occupancy state of the seat based on the threshold value that is specified by a usage of the function.

2. The apparatus according to claim 1, further comprising a position detecting portion detecting the height position of the seating portion, wherein the seat occupancy determining portion changes the threshold value based on the height position of the seating portion detected by the position detecting portion.

3. The apparatus according to claim 1, wherein the seat occupancy determining portion determines that an adult is seated on the seat in a case where the seating load being equal to or greater than the threshold value is detected by the load detecting portion and determining a child seat fastened state where a child seat is placed on the seat in a case where the seating load being smaller than the threshold value is detected by the load detecting portion.

4. The apparatus according to claim 2, wherein the seat occupancy determining portion determines that an adult is seated on the seat in a case where the seating load being equal to or greater than the threshold value is detected by the load detecting portion and determining a child seat fastened state where a child seat is placed on the seat in a case where the seating load being smaller than the threshold value is detected by the load detecting portion.

5. The apparatus according to claim 1, wherein the load detecting portion includes a load detecting portion provided between the floor for the vehicle and a left portion of the seating portion in a left and right direction thereof that corresponds to a width direction of the seat and a load detecting portion provided between the floor for the vehicle and a right portion of the seating portion in the left and right direction thereof, and the seat occupancy determining portion obtains the seating load on a basis of a sum of loads detected by the respective load detecting portions.

6. The apparatus according to claim 2, wherein the load detecting portion includes a load detecting portion provided between the floor for the vehicle and a left portion of the seating portion in a left and right direction thereof that corresponds to a width direction of the seat and a load detecting portion provided between the floor for the vehicle and a right portion of the seating portion in the left and right direction thereof, and the seat occupancy determining portion obtains the seating load on a basis of a sum of loads detected by the respective load detecting portions.

7. The apparatus according to claim 3, wherein the load detecting portion includes a load detecting portion provided between the floor for the vehicle and a left portion of the seating portion in a left and right direction thereof that corresponds to a width direction of the seat and a load detecting portion provided between the floor for the vehicle and a right portion of the seating portion in the left and right direction thereof, and the seat occupancy determining portion obtains the seating load on a basis of a sum of loads detected by the respective load detecting portions.

8. The apparatus according to claim 1, wherein the load detecting portion is provided between the rear portion of the seating portion and the floor for the vehicle, and the seat occupancy determining portion decreases the threshold value in association with an increase of the height position of the seating portion.

9. The apparatus according to claim 2, wherein the load detecting portion is provided between the rear portion of the seating portion and the floor for the vehicle, and the seat occupancy determining portion decreases the threshold value in association with an increase of the height position of the seating portion.

10. The apparatus according to claim 3, wherein the load detecting portion is provided between the rear portion of the seating portion and the floor for the vehicle, and the seat occupancy determining portion decreases the threshold value in association with an increase of the height position of the seating portion.

11. The apparatus according to claim 5, wherein the load detecting portion is provided between the rear portion of the seating portion and the floor for the vehicle, and the seat occupancy determining portion decreases the threshold value in association with an increase of the height position of the seating portion.

12. An apparatus for determining a seat occupancy, comprising:
    a load detecting portion provided between one of a front portion and a rear portion of a seating portion of a seat for a vehicle that includes a lifting function for changing a height position of the seating portion relative to a floor for the vehicle, the seat including a seat back at the rear portion of the seating portion of the seat, the load detecting portion detecting a seating load applied to the seating portion; and
    a seat occupancy determining portion comparing the seating load detected by the load detecting portion with a threshold value and determining a seat occupancy state of the seat, the seat occupancy determining portion changing the threshold value based on the height position of the seating portion;
    wherein the seat occupancy determining portion includes a map including one axis indicating one of the height position of the seating portion and the seating load and another axis indicating the other of the height position of the seating portion and the seating load for specifying the threshold value, and the seat occupancy determining portion determines the seat occupancy state of the seat based on the map.

13. A method for determining a seat occupancy, comprising:
    detecting a seating load applied to one of a front portion and a rear portion of a seating portion of a seat for a vehicle that includes a lifting function to change a height position of the seating portion relative to a floor for the vehicle, the seat including a seat back at the rear portion of the seating portion of the seat;
    determining a threshold value by a function based on the height position of the seating portion;

comparing the seating load applied to the seating portion with the threshold value and changing the threshold value based on the height position of the seating portion to determine a seat occupancy state of the seat based on the threshold value specified by the function.

* * * * *